United States Patent [19]

Nordenskjold

[11] 4,359,388

[45] Nov. 16, 1982

[54] FLUID FILTER

[76] Inventor: Ing R. V. Nordenskjold, Ernst Heinkel Ring, 8011 Hohenbrunn, Fed. Rep. of Germany

[21] Appl. No.: 229,013

[22] Filed: Jan. 27, 1981

Related U.S. Application Data

[63] Continuation-in-part of Ser. No. 82,132, Oct. 5, 1979, abandoned.

[51] Int. Cl.³ .................... B01D 33/14; B01D 46/20
[52] U.S. Cl. .................... 210/387; 210/402; 55/290; 55/354
[58] Field of Search ........... 55/290, 351, 352, 354, 55/400; 210/387, 400, 401, 402

[56] References Cited

U.S. PATENT DOCUMENTS

| | | | |
|---|---|---|---|
| 1,686,093 | 10/1928 | Manning | 2110/387 |
| 2,119,978 | 6/1938 | Wolthuis et al. | 55/354 |
| 3,040,495 | 6/1962 | Doebeli | 55/97 |
| 3,596,442 | 8/1971 | Neumann | 55/354 |
| 3,745,748 | 7/1973 | Goldfield et al. | 55/354 |
| 3,873,281 | 3/1975 | Himes et al. | 55/354 |
| 3,901,809 | 8/1975 | Ball et al. | 210/387 |
| 4,011,067 | 3/1977 | Carey, Jr. | 55/354 |

FOREIGN PATENT DOCUMENTS

| | | |
|---|---|---|
| 313754 | 6/1956 | Fed. Rep. of Germany . |
| 1830688 | 5/1961 | Fed. Rep. of Germany . |
| 2700942 | 7/1978 | Fed. Rep. of Germany . |
| 771867 | 4/1957 | United Kingdom . |
| 787725 | 12/1957 | United Kingdom . |
| 1009570 | 11/1965 | United Kingdom . |
| 1133526 | 11/1968 | United Kingdom . |
| 1267135 | 3/1972 | United Kingdom . |
| 1269703 | 4/2972 | United Kingdom . |
| 1314080 | 4/1973 | United Kingdom . |
| 1370517 | 10/1974 | United Kingdom . |
| 1520322 | 8/1978 | United Kingdom . |

Primary Examiner—David L. Lacey
Attorney, Agent, or Firm—Andrus, Sceales, Starke & Sawall

[57] ABSTRACT

A dust removing fluid filter has a continuous filter material web wound about a rotatable drum. The free end of the web is attached to a collector shaft which winds up the filter material web as it becomes contaminated.

8 Claims, 1 Drawing Figure

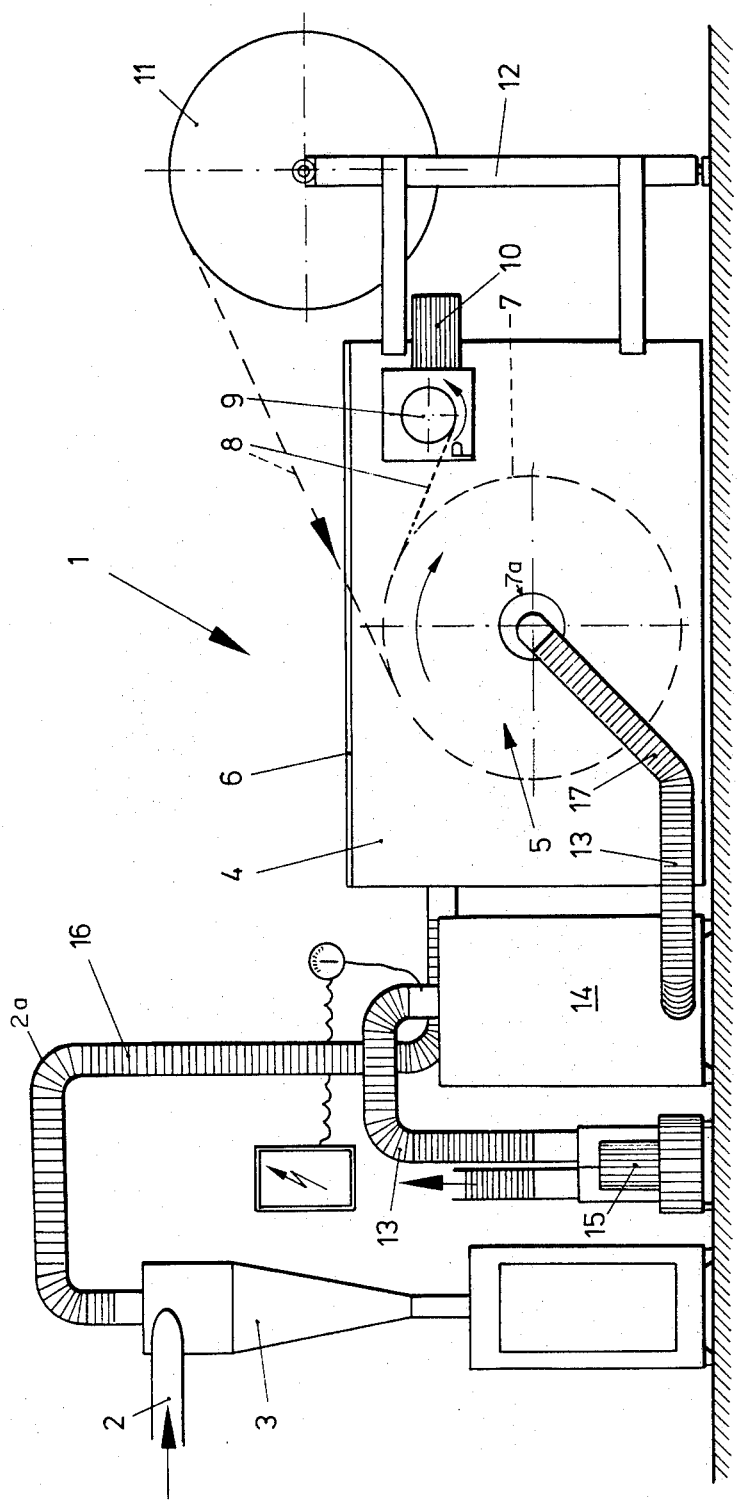

FLUID FILTER

BACKGROUND OF THE PRESENT INVENTION

This application is a continuation-in-part application of my application entitled "Fluid Filter" which was filed on Oct. 5, 1979, bearing Ser. No. 6/082,132, now abandoned.

This invention relates to a fluid filter for removing of for instance dust from a gas, or gaseous mixture, e.g. air, respectively, and includes a filter carrier adapted to receive a filter material thereon, and exhaustor means for forcing a gas therethrough.

In a practical use are cloth and paper filter apparatus adapted to be covered with a filter cloth or paper layers and hereinafter referred to as filter paper for purposes of explanation. They offer the advantageous possibility of removing even very fine dust from a gas by the use of extremely fine filter papers.

A major problem of these cloth filters is the renewal of the filter paper. On the one hand, renewal of the filter paper usually involves manual labor, and on the other hand the filter installation has to be shut down for renewal of the paper, since there is no filtering effect during such renewal, and the operating personnel could be exposed to danger.

In order to reduce the frequency of paper renewals, it has been proposed to provide known filter installations with very large filter surfaces so as to reduce the dust loading per surface unit and to extend the operating lifetime of the filter paper.

Due to the specific parameters of a filter installation, it is generally necessary to employ a special filter paper having particular filtering characteristics and dimensions adjusted to the filter installation in question. Filter papers of this kind are relatively expensive, resulting in high operating costs for a known filter installation of this type.

It is an object of the present invention to provide a dust filter of the type set forth in the introduction, such filter being of simple construction and economical operation, and being capable of operating for extended periods between filter material renewals.

SUMMARY OF THE PRESENT INVENTION

With a view to attaining the above object, the invention provides that the filter carrier comprises a rotatable drum having a drum support means to rotatably support the drum. A continuous filter material web is wound around the circumferential surface of the drum in a plurality of layers. The free outer end of said web is attached to a collector shaft disposed substantially parallel to the axis of rotation of said drum and serving to wind up the outermost layer of said filter material web as the contamination thereof proceeds. A flow means is coupled to the drum for forcing a fluid medium having foreign material therein through the plurality of layers on said drum with said fluid passing from the outermost layer through the successive layers whereby the foreign material is primarily deposited on the outermost layer.

The dust filter according to the invention is of simple construction. The drum serves for carrying a plurality of layers of a continuous filter material web. The filter material may be of any suitable kind, such as a paper web. Its width may be selected such that any inexpensive standard paper web may be employed. If it is desired to achieve an extremely fine filtering effect, it is possible to employ a substantial number of layers wound on the drum for achieving the desired filtering degree. The effectiveness of the filter may thus be adjusted by the selection of the number of paper layers. The drum configuration of the filter carrier permits a very large filtering surface to be accommodated within a relatively small volume.

In addition, the cylindrical shape of the drum offers the advantage that a considerably supply of the paper web may be wound onto its circumferential surface. Since the drum is rotatable, winding and unwinding the paper web offers no difficulties. Since the outer free end of the paper web is attached to the collector shaft, the paper web may be unwound from the drum on attaining a certain degree of contamination without requiring the filter installation to be shut down. This permits continuous operation of the filter installation for extended periods between replenishments of the drum with new filter paper.

Advantageously the paper web is attached to the collector shaft in such a manner that the dust collected thereon is wrapped between paper layers so as to be safely contained.

The dust filter according to the invention is well suited for automatic operation. The gas enters the drum through its circumferential surface and is withdrawn therefrom adjacent its axis of rotation. It is easily possible to measure the pressure of the gas upstream and downstream of the drum. A predetermined decrease of the pressure at the measuring point downstream of the drum is indicative of substantial contamination of the outermost paper layer, necessitating its removal. At this instance the collector shaft may be rotated to unwind the contaminated outermost layer of the paper web so as to expose the next not yet contaminated layer. This process may be readily controlled in an automatic manner, as will be perceived by those skilled in the art.

In an advantageous embodiment, the invention provides that the collector shaft is located laterally of the drum in such a manner that the portion of the filter material web extending towards said collector shaft has its upper surface covered with the collected dust. This arrangement ensures that the dust does not drop off the web portion extending towards the collector shaft during the transfer process.

With this arrangement the collector shaft is advantageously driven in such a manner that the paper web is wound thereon with its contaminated side facing inwards. In this manner the dust is enclosed between the previously wound layer of the package and the layer being wound thereon.

Advantageously the collector shaft is located at a higher level than the axis of rotation of the drum, without its circumferential surface extending at a higher level, however, than that of said drum. This arrangement ensures that the web portion extending towards the collector shaft has a downward inclination, so that any loosened dust particles roll downwards towards the collector shaft.

In an advantageous embodiment of the invention, economical replenishment of the filter drum is ensured by providing a support shaft for carrying a supply roll of the paper web permitting said web to be wound directly onto the drum for the replenishment thereof.

BRIEF DESCRIPTION OF THE DRAWINGS

An advantageous embodiment of the invention shall now be described by way of example with reference to the accompanying drawing the only FIGURE of which shows a side view of the dust filter according to the invention.

DESCRIPTION OF THE ILLUSTRATED EMBODIMENT

The shown dust filter apparatus installation 1 has a supply duct 2 for a gas which contains a foreign material, such as dust particles, to be filtered. Duct 2 leads to a per se known cyclone 3 for removing coarse dust particles. From cyclone 3, a duct 2a leads to a closed housing 4 containing the dust filter 5 to direct the gas into the filter, in the illustrated embodiment of the invention. A removable cover 6 is provided on top of housing 4.

Dust filter 5 includes a filter carrier 7 in the form of a drum supported in any suitable manner such as a suitably bearing support brackets mounted within the housing to the housing wall as at 7a or the like to form a support means for the drum for rotation about a horizontal axis. As illustrated, drum 7 has a cloth stretched over its circumferential surface. The cloth serves as a support for a plurality of layers of a continuous paper web 8 wound onto the circumferential surface of the drum for replenishment thereof. In the present case paper web 8 may be wound with e.g. twenty layers on the drum. The layers are wound on the drum as tightly as possible.

The free outer end of the paper web is attached to a collector shaft 9 supported in the present case for rotation about a horizontal axis within housing 4 in the same manner as the drum. Collector shaft 9 has a considerably smaller diameter than drum 7 and may be rotated in the direction of arrow P by a motor 10.

Collector shaft 9 is disposed laterally of the drum at such a loaction that the portion of the paper web extending from the drum to the collector shaft faces substantially upwards with that side forming its outer surface when on the drum. Furthermore the paper web is guided from the drum towards the collector shaft in such a manner that its side forming the outer surface when on the drum faces inwards when wound on the collector shaft. The collector shaft is supported above the level of the axis of rotation of the drum, but below the highest level of its circumferential surface, so that the portion of the paper web 8 extending towards the collector shaft slopes downwards.

The righthand end of housing 4 as shown in the drawing is freely accessible for a transport vehicle, e.g. a fork lift truck. Provided at this end is a support structure 12 rotatably supporting a supply roll 11 of the paper web 8. The supply roll may be readily mounted from above in bearing shells of support structure 12 by means of the already mentioned fork lift truck. All that is then necessary for replenishing the drum with paper is to take off the housing cover 6, so that the requisite number of layers of the paper web may be wound onto the drum.

An outlet duct 13 leading from the interior of the drum adjacent its axis of rotation is connected to an active carbon filter 14 wherein the gas is deodorized. From there duct 13 leads to a blower 15 operating as an exhaustor, although any other suitable flow creating means such as a pressure source on the inlet said of the system may be used. The outlet of the blower opens into the environment.

In operation of the illustrated installation, the suction effect of the exhauster-blower causes the dust-containing gas to pass through the cyclone in which coarse dust particles are removed therefrom. Subsequently the gas flows through duct 2a into housing 4 and into the interior of drum 5 through the circumferential surface thereof. On its way to the interior of the drum, the gas has to pass through the layers of the paper web 8 wound on the drum, with the fine dust particles being retained mainly by the outermost layer. The cleaned gas flows through outlet duct 13 towards and into the active carbon filter 14, wherein it is deodorized before passing to the free atmosphere via the exhauster-blower. If the outermost layer of paper web 8 becomes contaminated to such a degree that economical operation of the filet is no longer possible, motor 10 may be energized to rotate collector shaft 9 in the direction of arrow P, so that the contaminated outermost layer of paper web 8 is wound thereon together with the dust collected on the web.

Since the portion of the paper web extending from the drum towards the collector shaft slopes downwards in the direction of the shaft, any dust loosened by the transfer process can only move downwards in the direction of the collector shaft so that it is captured between the layers being wound thereon.

It is a particular feature of the invention that the paper web is wound on the drum in a plurality of layers, so that on attaining a certain degree of contamination the outermost layer may be unwound without interrupting operation of the filter installation. In this manner it is possible to continuously operate the filter installation for a period depending on the number of layers between replenishments of the drum.

After the number of layers on the drum has decreased to such a degree that reliable retention of the dust is no longer ensured, the installation has to be shut down. The remaining paper web layers are then wound over onto the collector shaft, which may then be replaced by an empty shaft. The requisite number of layers of the paper web may then be wound from the supply roll 11 onto the drum as by rotating the latter anticlockwise. After winding the required number of layers, the paper web 8 is cut off, and its free end is attached to the new collector shaft 9, whereupon the filter is again ready for use. The cover 6 which has been removed for the replenishing operation is returned onto the housing.

The dust filter according to the invention is ideally suited for automatic control. To this effect, the operating pressure may be measured at a point 16 upstream and at a point 17 downstream of the filter. A progressive decrease of the pressure at point 17 in comparison to the pressure prevailing at point 16 is indicative of the degree of contamination of the outermost layer of the paper web 8, and may be employed for automatically energizing motor 10 for winding the contaminated paper web onto the collector shaft 9.

It is of course also conceivable to operate motor 10 continuously at a slow speed, so that a continuous renewal of the outermost layer of the paper web on the drum takes place.

Practical tests have shown the fact, to the surprise of the skilled artisan, that the still clean inner layers of the paper web do not cause an increase in flow resistance.

The fluid filter operates by suction, i.e. by negative pressure. This has the considerable advantage that the collected dust cannot escape. It is even conceivable to automatically enclose the dust-charged paper rolls in containers within the housing for subsequent disposal. This possibility is of particular importance in the case of noxious substances being separated from a fluid.

Preferably a number of layers of the paper web may be wound on the circumferential surface of the drum with their ends bonded to one another, so that they can remain on the drum for an extended period. In this simple manner it is possible to prevent all of the paper layers to be inadvertently unwound from the drum. The renewable filter paper web may then be wound onto these innermost layers.

In order to avoid the possibility that all layers of the paper web are unwound from the drum, one of the lower layers, for instance the third-innermost layer, may be formed with an opening or a notch for engagement by a scanning device to generate a signal.

Particularly in the case of separating powdery materials from a fluid, it is of considerable advantage that the filtering is by means of several layers of filter material, so that the finest dust particles possibly passing through the outer layers are retained by the following layers. The filter is not restricted to use as a dust filter, but may also be used for treating other fluids, for instance as a wet filter. Instead of, or in addition to, a filter material of a cellulose basis, the fluid filter may be provided with a filter material web of another kind, for instance with a web of filter cloth or a foamed material.

Although shown mounted within a housing 4, the housing may obviously be ommitted and the dust filter 5 mounted directly to receive the surrounding environment. For example, the dust filter may be mounted to the exterior of a building and draw the surrounding air through the filter and deliver filtered air to the building. These and other modification may be provided within the scope of the present invention.

We claim:

1. A fluid filter apparatus for removing foreign material such as for instance dust from a fluid medium by forcing the fluid medium through a filter material, said apparatus comprising drum support means (4, 7a) a drum (7) having a circumferential surface and mounted on said drum support means for rotation about the drum axis, a continuous filter material web (8) wound about the circumferential surface of said drum (7) in a plurality of layers and having a free outer end, means (15) coupled to the filter apparatus and in flow communication with the drum for forcing a fluid medium having a foreign material therein through the plurality of layers on said drum with said fluid medium passing from the outermost layer through the successive layers whereby the foreign material is primarily deposited on the outermost layer and a clean fluid is removed from the interior of the drum, a collector shaft (9) rotatably mounted substantially parallel to the axis of the drum, means connecting the free outer end of said web to said collector shaft (9), and means for actuating said collector shaft to wind the outermost layer of said filter material web (8) from said drum to the collector shaft as the contamination of the layer proceeds.

2. A fluid filter apparatus according to claim 1, wherein said collector shaft (9) is located laterally of said drum (7) and is constructed and arranged to support the portion of said filter material web (8) extending from said drum towards said collector shaft such that the upper surface of the web is covered with the collected foreign material.

3. A fluid filter apparatus according to claim 1 or 2, wherein said collector shaft (9) is rotatably driven by drive means (10) which drive said shaft so as to wind said filter material web (8) onto the collector shaft such that said contaminated surface of the web faces inwardly toward the collector shaft.

4. A fluid filter apparatus according to claim 3 wherein said collector shaft (9) is located above the axis of rotation of said drum (7) and having its circumferential surface located beneath the circumferential surface of said drum.

5. A fluid filter apparatus according to claim 3 including a supply roll (11) of said filter material web, a roll supply shaft mounted in spaced relation to said drum, said supply roll mounted on said support shaft and having a continuous length of said filter web wound thereon and having an outer end, said support shaft being adapted to rotate for removal of the web and permitting the end of said web of said supply roll to be connected to the drum and wound directly from the supply roll onto said drum for the replenishment of the multiple layer web on the drum.

6. A fluid filter apparatus according to claim 3 wherein said collector shaft (9) is located above the axis of rotation of said drum (7) and having its circumferential surface located beneath the circumferential surface of said drum, a supply roll (11) of said filter material web, a support shaft mounted in space relation to said drum, said supply roll mounted in said support shaft and having a continuous length of said filter web wound thereon and having an outer end, said support shaft being adapted to rotate for removal of the web and permitting the end of said web of said supply roll to be connected to the drum and wound directly from the supply roll onto said drum for the replenishment of the multiple layer web on the drum.

7. A fluid filter apparatus according to any one of claims 1 or 2 wherein said collector shaft (9) is located above the axis of rotation of said drum (7) and having its circumferential surface located beneath the circumferential surface of said drum.

8. A fluid filter apparatus according to claim 1 or 2 including a supply roll (11) of said filter material web, a support shaft mounted in spaced relation to said drum, said supply roll being mounted on said support shaft and having a continuous length of said filter web wound thereon and having an outer end, said support shaft being adapted to rotate for removal of the web and permitting the end of said web of said supply roll to be connected to the drum and wound directly from the supply roll onto said drum for the replenishment of the multiple layer web on the drum.

* * * * *